UNITED STATES PATENT OFFICE.

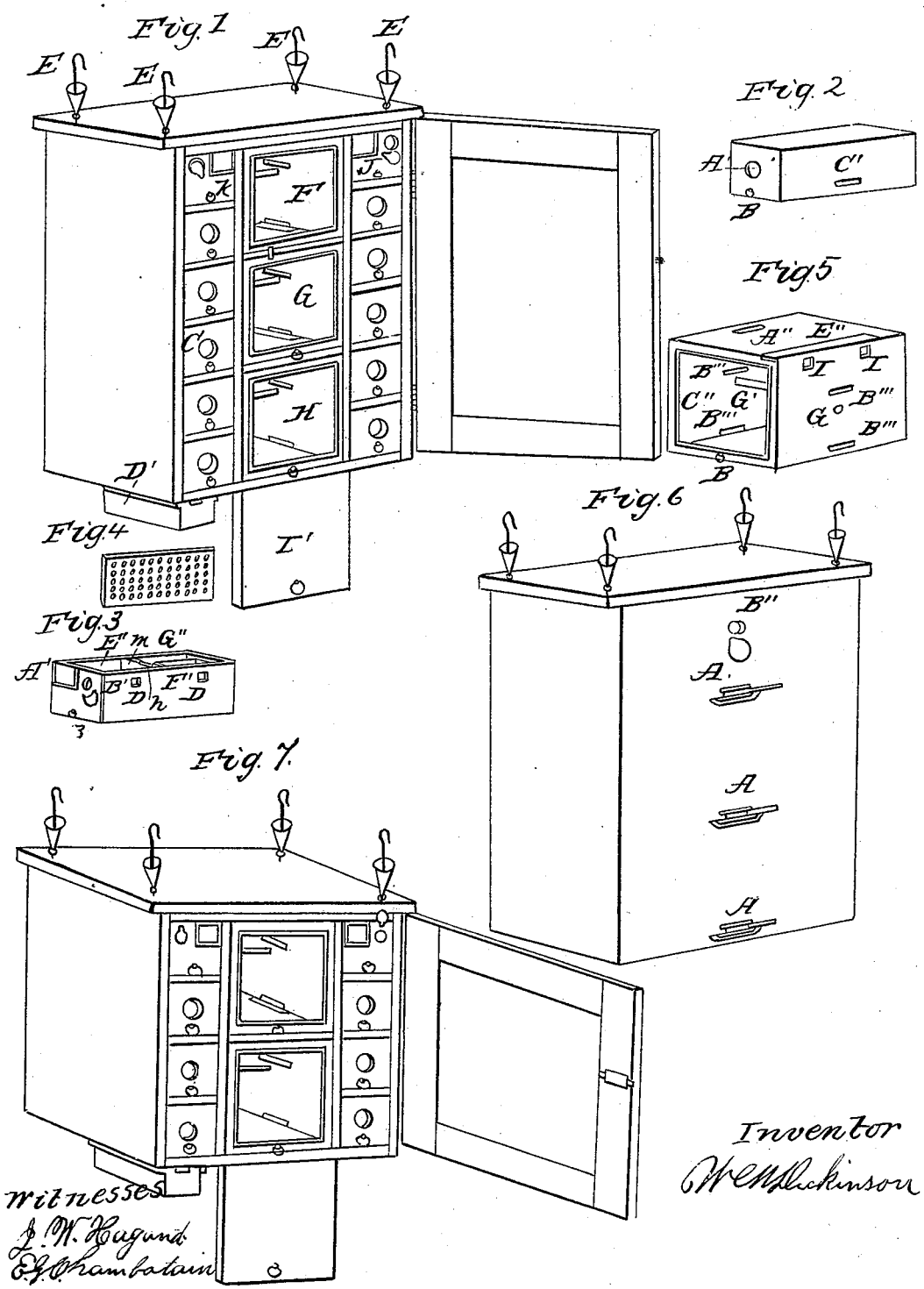

WILLIAM M. DICKINSON, OF GOSHEN, INDIANA.

IMPROVEMENT IN BEE-HIVES.

Specification forming part of Letters Patent No. 38,660, dated May 26, 1863.

*To all whom it may concern:*

Be it known that I, WILLIAM M. DICKINSON, of Goshen, in the county of Elkhart and State of Indiana, have invented a certain new and useful Improvement in Bee-Hives; and I do hereby declare the following to be a full and exact description of the same, reference being had to the accompanying drawings, making part of this specification, in which—

Figure 1 is a perspective view of my improved bee-hive, looking from the rear side, the door being left open to show the interior arrangement of the brood, honey, and feed boxes hereinafter described. Fig. 2 is a perspective view of honey-box. Fig. 3 is a perspective view of feed-box. Fig. 4 is a perspective view of the float. Fig. 5 is a perspective view of brood-box. Fig. 6 is a perspective view of a hive, looking from the front side, showing the main bee-entrances in their open condition. Fig. 7 is a perspective view of a hive, looking from the rear, constructed with two brood-boxes only, the number of honey-boxes being requisitely decreased.

The invention consists of a rectangular box of such dimensions and so divided by upright and horizontal partitions as to admit of the required number and arrangement of the several brood, honey, and feed boxes, together with a moth-decoy drawer, the whole to be suspended by four iron hooks, one at each upper corner of the hive, said hooks being inclosed by cups or vessels in the form of inverted cones, to be filled with any suitable liquid for the purpose of excluding and destroying hostile vermin.

To enable others skilled in the art to which my invention appertains to fully understand and use the same, I will proceed to describe its construction and operation.

The palace, as represented by Fig. 1, is composed of three brood-boxes, F G H, ten honey-boxes, c, and two feed-boxes, J and K, all communicating with each other, as hereinafter described. Each honey and each brood box is similarly constructed, so that the description of one of each will suffice.

In Fig. 2, which is a perspective view of the honey-box, looking from the rear side, A' represents a glass of suitable dimensions, C' the outer bee-passage, and B a ring or knob, whereby the box may be withdrawn from its casing when desired. This honey-box is provided with a bee-passage in each side, which corresponds to and communicates with the passages in the brood-boxes.

Fig. 5 is a similar view of a brood-box provided with a bee-passage in its front end and at bottom, (not shown in the drawings,) communicating with the outer bee-passage, A. (Shown in Fig. 6.) The rear end of the brood-box is furnished with a pane of glass, c'', which permits the inspection of the brood. G is the comb-supporter. The top of this box is provided with two apertures, which afford the means of communication with the other brood-boxes. A'' represents one of these apertures. The other is represented as being closed by a tin slide, E'', showing the mode of cutting off communication with the other brood-boxes when desired. B''' are passages communicating laterally with the adjacent honey-boxes. Each brood-box is provided with apertures or passages I I, to adapt it to communicate with apertures D D, Fig. 3, in the feed-boxes. At the front end of each brood-box, near the top thereof is an aperture or apertures adapted, when placed in the upper niche for the brood-boxes, to correspond with a ventilator, shown at B'', Fig. 6. This ventilator may be regulated by a valve of common construction, so that any desired quantity of air may be permitted to enter and circulate throughout the entire series of brood, honey, and feed boxes through the medium of their respective apertures or passages.

The brood-boxes, as shown in the accompanying drawings, may be constructed without bottoms, so as to afford more ready access to the inside thereof for the purpose of cleaning, &c., or they may be provided with any suitable adjustable bottom.

Fig. 3 is a rear perspective view of the feed-box, (shown at J, Fig. 1,) which is equally divided by a transverse partition, *m*. D D are the apertures, communicating, as before explained, with the apertures I I in the brood-boxes. E is the water-department, provided with a perforated float of pine wood or other suitable material. *h* is a passage communicating from the watering-department to the flour-box G'' and salt-pan F'. E E are suspension-hooks, provided near their lower ends with a cup, the shape of each being that of an inverted cone. On the hive being suspended, these cups are supplied with water, oil, or any other suitable liquid, for the purpose of destroying, and consequently excluding, any vermin which may attempt to enter the hive. I is a door hinged to the under side of the hive and closed by a button, whereby the palace may be readily cleaned when desired. The under side of the hive is also provided with a moth-decoy drawer, D', which is filled with honey-comb, and as the moth-miller will invariably enter such an enticing apartment and deposit its effects, the apiarian is enabled not only to destroy the germs which have been deposited in the comb, but the moth-miller itself.

Having thus described my invention, what I claim as new, and desire to secure by Letters Patent, is—

1. The feed-boxes J K, each constructed with compartments E' F' G'' and apertures D D, in combination with the brood-box F and apertures I I, arranged to operate in the manner and for the purpose specified.

2. The brood-boxes F G H, in combination with the honey-boxes c and feed-boxes J K, the whole arranged so as to communicate with each other in the manner and for the purpose specified.

3. Suspending the hive by hooks E, which are inclosed by cups or vessels to be filled with liquor, in the manner and for the purpose specified.

W. M. DICKINSON.

In presence of—
E. G. CHAMBERLAIN,
J. W. HAGANS.